(12) United States Patent
Kim et al.

(10) Patent No.: US 12,447,624 B2
(45) Date of Patent: Oct. 21, 2025

(54) MATERIAL TRANSPORT HAND, MATERIAL TRANSPORT DEVICE, AND MATERIAL TRANSPORT METHOD

(71) Applicant: HANWHA ROBOTICS CORPORATION, Seongnam-si (KR)

(72) Inventors: Kwang Il Kim, Seoul (KR); Ji Hwan Roh, Seoul (KR); Dong Hyun Kim, Seoul (KR); Tae Gyeong Kim, Seoul (KR)

(73) Assignee: HANWHA ROBOTICS CORPORATION, Seongnam-si (KR)

( * ) Notice: Subject to any disclaimer, the term of this patent is extended or adjusted under 35 U.S.C. 154(b) by 287 days.

(21) Appl. No.: 18/122,503

(22) Filed: Mar. 16, 2023

(65) Prior Publication Data

US 2023/0226697 A1    Jul. 20, 2023

Related U.S. Application Data

(63) Continuation of application No. PCT/KR2022/006618, filed on May 10, 2022.

(30) Foreign Application Priority Data

Dec. 30, 2021   (KR) .................. 10-2021-0193419

(51) Int. Cl.
   *B25J 9/16*   (2006.01)
   *B25J 5/00*   (2006.01)
   *B25J 15/00*  (2006.01)

(52) U.S. Cl.
   CPC ............. *B25J 9/1692* (2013.01); *B25J 5/007* (2013.01); *B25J 9/1694* (2013.01); *B25J 15/0052* (2013.01)

(58) Field of Classification Search
   CPC ........ B25J 9/1692; B25J 5/007; B25J 9/1694; B25J 15/0052; B25J 9/0087; B25J 9/023;
   (Continued)

(56) References Cited

U.S. PATENT DOCUMENTS 10,380,473 B2    8/2019  Manci et al.
2012/0321423 A1*  12/2012  MacKnight ....... H01L 21/67276
                                                      414/664
(Continued)

FOREIGN PATENT DOCUMENTS

JP    7-206228 A     8/1995
JP    2018-095352 A  6/2018
(Continued)

OTHER PUBLICATIONS

International Search Report (PCT/ISA/210) issued by the International Searching Authority on Apr. 4, 2023 in corresponding International Application No. PCT/KR2022/006618.
(Continued)

*Primary Examiner* — Jason Holloway
(74) *Attorney, Agent, or Firm* — Sughrue Mion, PLLC

(57) ABSTRACT

A material transport device including a transfer hand for receiving a material from a counterpart device or delivering the material to the counterpart device includes an unmanned transport vehicle moving along a preset path, a main body disposed on the unmanned transport vehicle, and a transfer hand disposed inside the main body, at least partially protruding outward from the main body, loading or unloading the material, and including a positioning sensor detecting a marker disposed on the counterpart device and determining a position difference with the counterpart device, and the material transport device calibrates a position of the transfer hand based on the position difference determined by the positioning sensor.

14 Claims, 11 Drawing Sheets

(58) Field of Classification Search
CPC . B25J 19/023; B66F 9/063; B66F 9/16; B66F 9/184; B66F 9/24; B66F 2700/09
See application file for complete search history.

(56) References Cited

U.S. PATENT DOCUMENTS

| | | | |
|---|---|---|---|
| 2014/0017048 A1* | 1/2014 | Mattern | B25J 9/0084 |
| | | | 414/730 |
| 2015/0139766 A1 | 5/2015 | Cousins | |
| 2019/0094866 A1* | 3/2019 | Moore | G05D 1/0289 |
| 2020/0316786 A1* | 10/2020 | Galluzzo | B25J 9/162 |
| 2020/0376671 A1 | 12/2020 | Taylor et al. | |

FOREIGN PATENT DOCUMENTS

| | | |
|---|---|---|
| JP | 2019-116356 A | 7/2019 |
| KR | 10-2007-0030529 A | 3/2007 |
| KR | 10-2013-0062132 A | 6/2013 |
| KR | 10-2019-0023071 A | 3/2019 |
| KR | 10-2325380 B1 | 11/2021 |

OTHER PUBLICATIONS

Communication issued on Oct. 16, 2024 by the European Patent Office for European Patent Application No. 22868436.1.
Communication dated Aug. 5, 2024, issued by the Korean Patent Office in Korean Application No. 10-2021-0193419.

* cited by examiner

MATERIAL TRANSPORT HAND, MATERIAL TRANSPORT DEVICE, AND MATERIAL TRANSPORT METHOD

CROSS-REFERENCE TO RELATED APPLICATION(S)

This application is a bypass continuation of International Application No. PCT/KR2022/006618, filed on May 10, 2022, in the Korean Intellectual Property Receiving Office, which is based on and claims priority to Korean Patent Application No. 10-2021-0193419, filed on Dec. 30, 2021, in the Korean Intellectual Property Office, the disclosures of which are incorporated herein by reference in their entireties.

TECHNICAL FIELD

The present disclosure relates to a material transport device and a material transport method using the material transport device.

BACKGROUND ART

In transporting and loading secondary battery electrode plates, paper, or steel plates wound in a circular core shape, such as a roll or a reel, conventionally, a pneumatic shaft is used to spray and adhere air to surface pressure.

However, since such a structure needs to have an air tank or an air compressor in order to use air, it is suitable for stationary equipment but is not suitable for installation on a moving body, such as a transfer cart.

The above-described background art is technical information that the inventor possessed for derivation of the present disclosure or acquired during the derivation process of the present disclosure, and may not be necessarily known art disclosed to the general public prior to filing the present disclosure.

DISCLOSURE

Technical Problem

The present disclosure is for solving the above-mentioned problem, and relates to a device and a method capable of smoothly transporting a material by precisely calibrating a position between a material transport device and a counterpart device.

However, the problem is an example, and the problem to be solved by the present disclosure is not limited thereto.

Technical Solution

A material transport device including a transfer hand for receiving a material from a counterpart device or delivering the material to the counterpart device according to an embodiment of the present disclosure includes an unmanned transport vehicle moving along a preset path, a main body disposed on the unmanned transport vehicle, and a transfer hand disposed inside the main body, at least partially protruding outward from the main body, loading or unloading the material, and comprising a positioning sensor detecting a marker disposed on the counterpart device and determining a position difference with the counterpart device, and calibrates a position of the transfer hand based on the position difference determined by the positioning sensor.

The material transport device may further include a hand mover disposed on one side of the main body and moving the transfer hand in a vertical direction according to a position of the marker detected by the positioning sensor.

A pair of transfer hands may be provided so as to face each other, and a pair of hand movers are provided to correspond to the pair of transfer hands, respectively, and may be driven independently of each other.

The pair of transfer hands may be disposed on a central axis of the material transport device, and the pair of hand movers may be arranged to face each other with respect to the pair of transfer hands, and may include hand moving motors and lifting members connected to the pair of transfer hands and moving up and down according to driving of the hand moving motor.

The material transport device may further include a rail mover disposed between the unmanned transport vehicle and the main body and moving the main body in a width direction of the unmanned transport vehicle by moving a slider moving along a sliding rail disposed on an upper surface of the unmanned transport vehicle.

The unmanned transport vehicle may rotate according to a position of the marker detected by the positioning sensor and adjust an angle at which the transfer hand is directed.

The positioning sensor may be a vision sensor disposed at a front end of the transfer hand, photograph a marker of the counterpart device, and calculate a position difference between the transfer hand and the counterpart device based on a captured image.

A material transport method of receiving a material from a counterpart device or delivering the material to the counterpart device according to an embodiment of the present disclosure includes moving along a preset path, by an unmanned transport vehicle, when the unmanned transport vehicle arrives at a preset position, detecting a marker of the counterpart device through a positioning sensor and detecting a position difference between the transfer hand and the counterpart device, by a transfer hand on or from which the material is loaded or unloaded, and moving the transfer hand according to a position of the marker detected by the positioning sensor.

The moving of the transfer hand may include moving the transfer hand in a vertical direction using a hand mover.

The hand movers may be provided in a same number as a pair of transfer hands so as to face each other, and respectively drive the pair of transfer hands independently of each other.

The moving of the transfer hand may include driving a hand moving motor and moving a lifting member connected to the transfer hand up and down.

The material transport method may further include moving a slider along a sliding rail through a rail mover and adjusting a position of the transfer hand in left and right directions.

The moving of the transfer hand may further include rotating according to a position of the marker detected by the positioning sensor and adjusting an angle at which the transfer hand is directed, by the unmanned transport vehicle.

The detecting of the position difference may include photographing a marker of the counterpart device, and calculating a position difference between the transfer hand and the counterpart device based on a captured image, by the positioning sensor which is a vision sensor disposed at a front end of the transfer hand.

Other aspects, features, and advantages other than those described above will become clear from the detailed description, the claims, and the drawings for carrying out the invention below.

Advantageous Effects

The material transport device and the material transport method according to the present disclosure may precisely transport the material between the material transport device and the counterpart device.

BEST MODE

Figure 1:
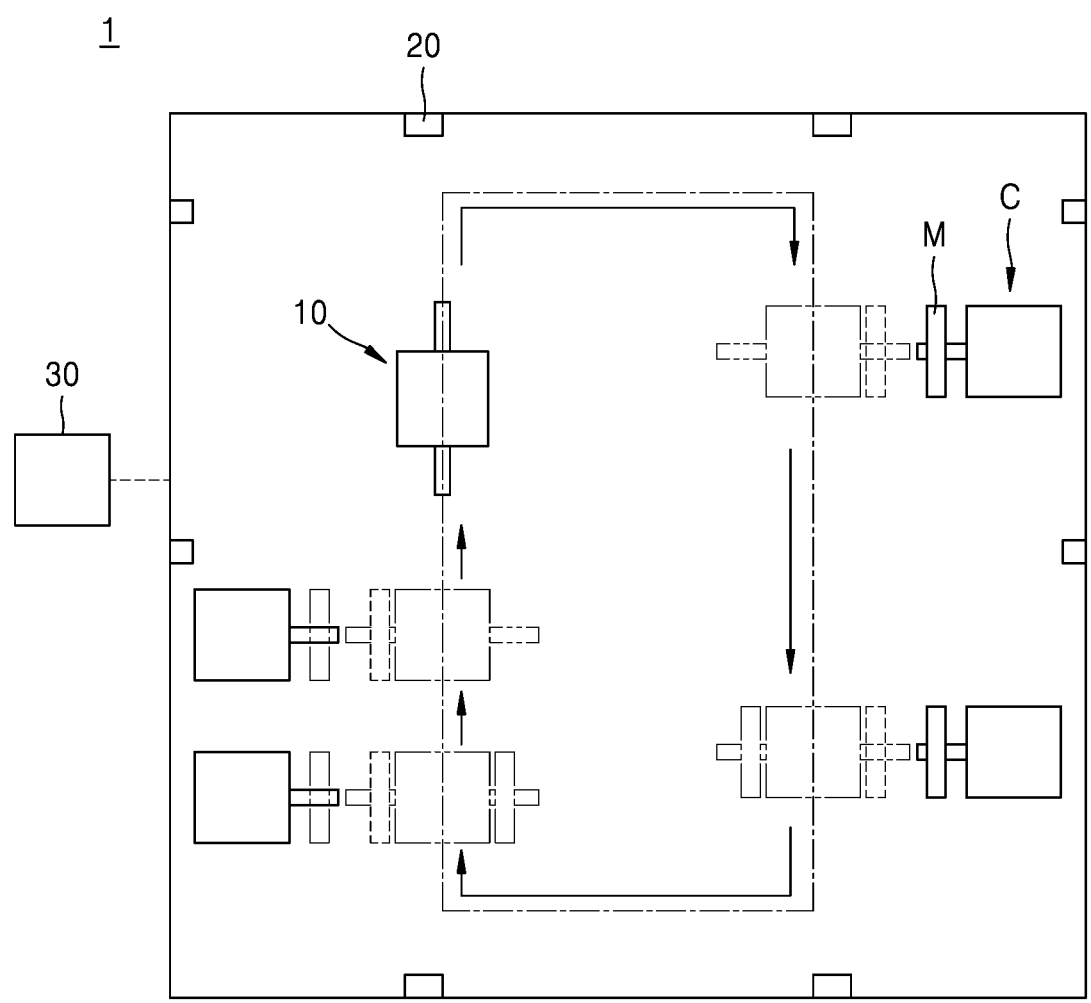
FIG. 1 shows a material transport device according to an embodiment of the present disclosure.

A material transport device including a transfer hand for receiving a material from a counterpart device or delivering the material to the counterpart device according to an embodiment of the present disclosure includes an unmanned transport vehicle moving along a preset path, a main body disposed on the unmanned transport vehicle, and a transfer hand disposed inside the main body, at least partially protruding outward from the main body, loading or unloading the material, and comprising a positioning sensor detecting a marker disposed on the counterpart device and determining a position difference with the counterpart device, and calibrates a position of the transfer hand based on the position difference determined by the positioning sensor.

MODE FOR INVENTION

The present disclosure may have various modifications and various embodiments, and specific embodiments are illustrated in the drawings and are described in detail in the detailed description. However, this is not intended to limit the present disclosure to particular embodiments, and it will be understood that all changes, equivalents, and substitutes that do not depart from the spirit and technical scope of the present disclosure are encompassed in the present disclosure. In the description of the present disclosure, even though elements are illustrated in other embodiments, like reference numerals are used to refer to like elements.

Hereinafter, embodiments of the present disclosure will be described in detail with reference to the accompanying drawings, and in the following description with reference to the drawings, like reference numerals refer to like elements and redundant descriptions thereof will be omitted.

Although the terms "first," "second," etc. may be used to describe various elements, these elements should not be limited by these terms. These terms are only used to distinguish one element from another.

An expression used in the singular encompasses the expression of the plural, unless it has a clearly different meaning in the context.

It will be understood that the terms "comprise," "comprising," "include" and/or "including" as used herein specify the presence of stated features or elements but do not preclude the addition of one or more other features or elements.

Sizes of elements in the drawings may be exaggerated or reduced for convenience of explanation. In other words, because sizes and thicknesses of elements in the drawings are arbitrarily illustrated for convenience of explanation, the present disclosure is not necessarily limited thereto.

The x-axis, the y-axis and the z-axis are not limited to three axes of the rectangular coordinate system, and may be interpreted in a broader sense. For example, the x axis, the y axis, and the z axis may be perpendicular to one another or may represent different directions that are not perpendicular to one another.

In the case where a certain embodiment may be implemented differently, a specific process order may be performed in the order different from the described order. As an example, two processes that are successively described may be substantially simultaneously performed or performed in the order opposite to the order described.

The terms used herein are only used to describe particular embodiments and are not intended to limit the scope of the present disclosure. It will be understood that the terms "comprise," "comprising," "include" and/or "including" as used herein specify the presence of stated features, numbers, steps, operations, elements, parts, and combinations thereof, but do not preclude in advance the presence or addition of one or more other features, numbers, steps, operations, elements, parts, combinations thereof.

Figure 2:
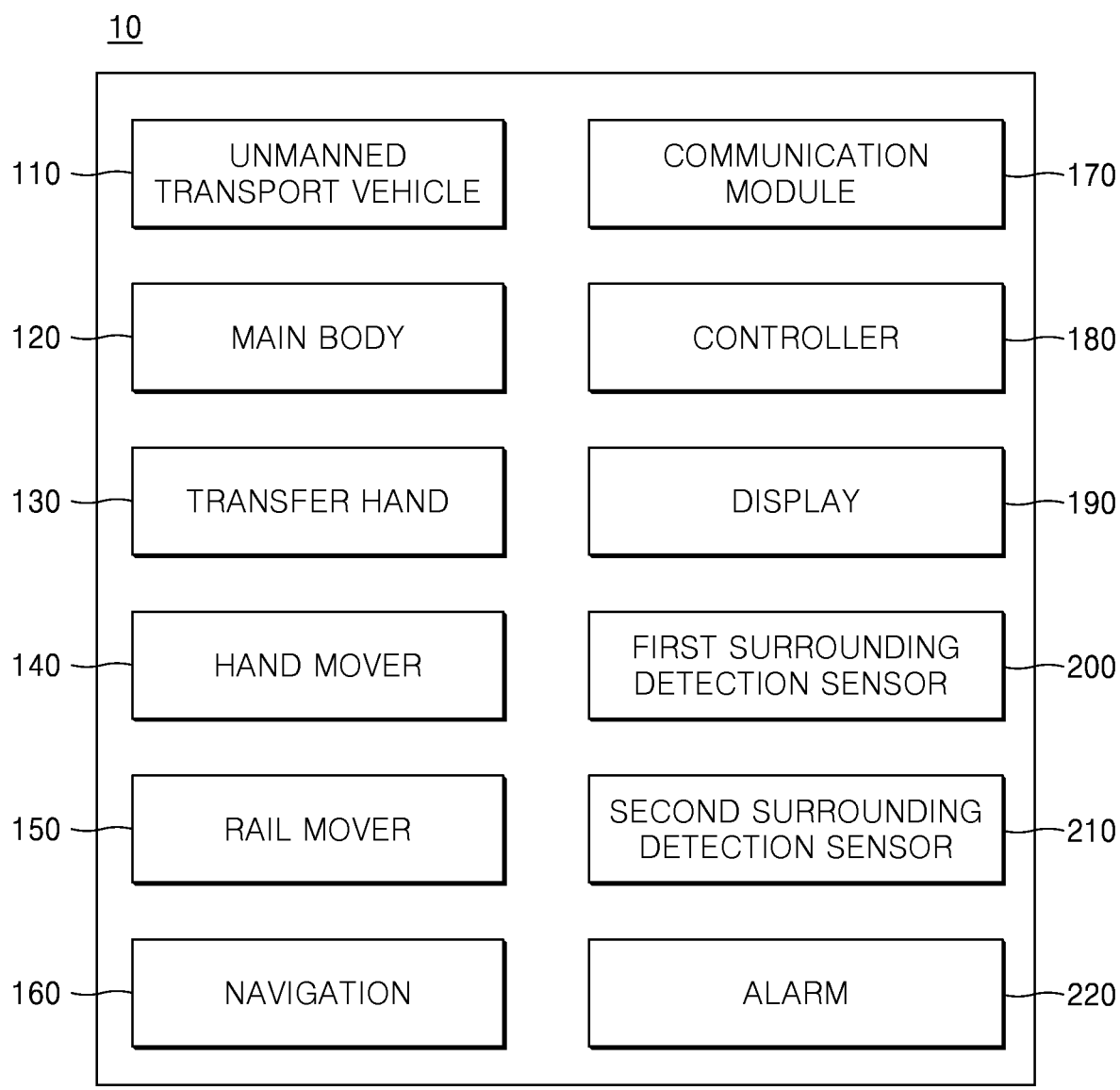
FIG. 2 schematically shows the configuration of the material transport device according to an embodiment of the present disclosure.
Figure 3:
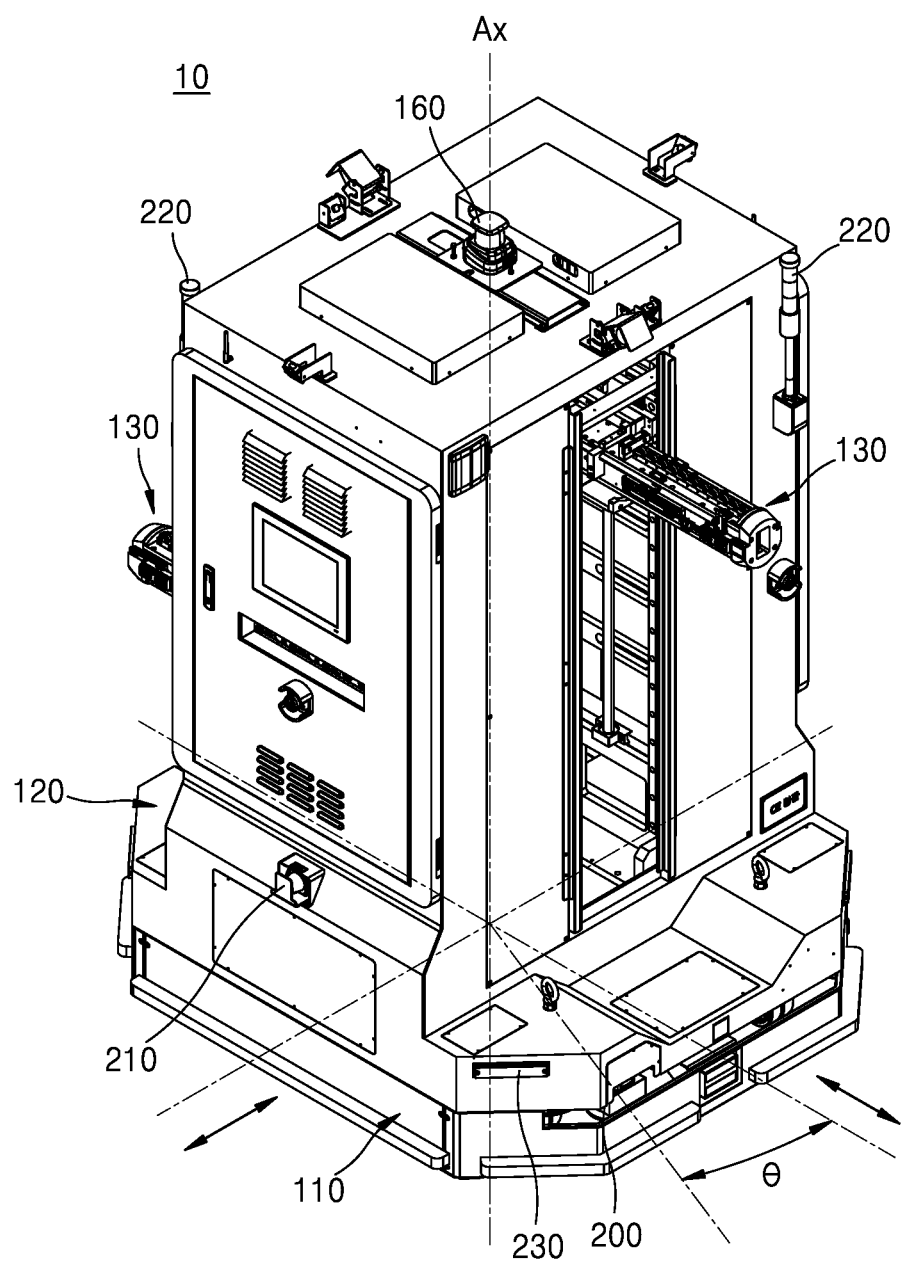
FIG. 3 shows a perspective view of the material transport device according to an embodiment of the present disclosure.
Figure 4:
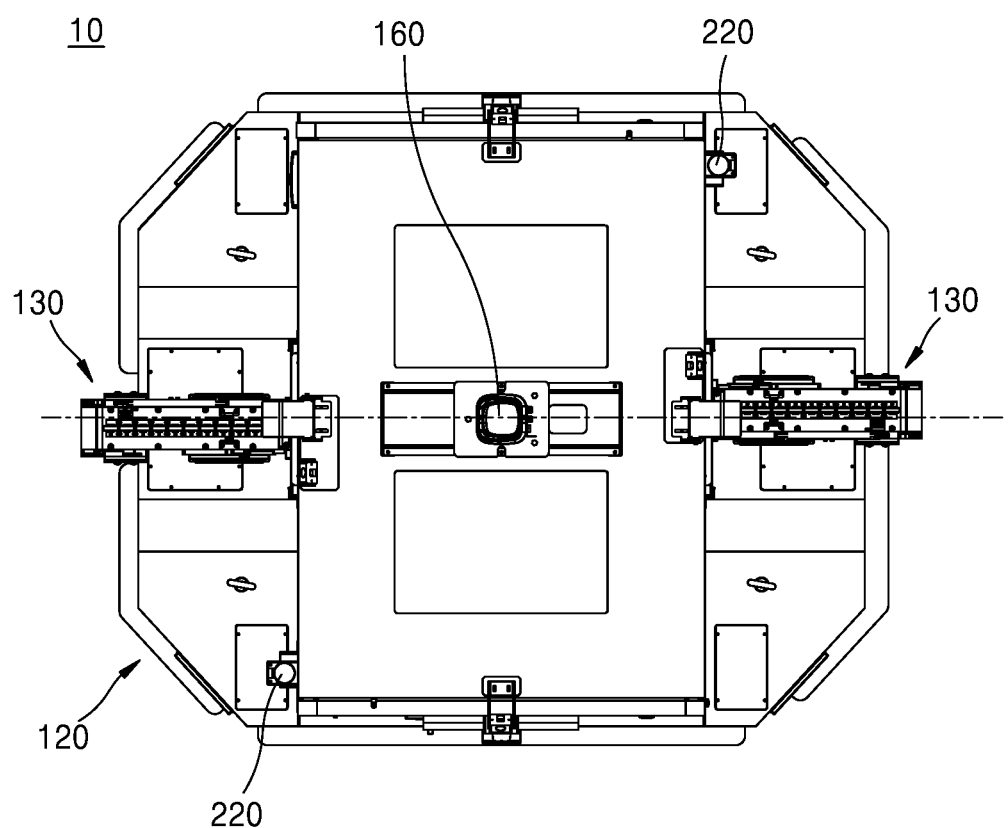
FIG. 4 shows a plan view of the material transport device according to an embodiment of the present disclosure.
Figure 5:
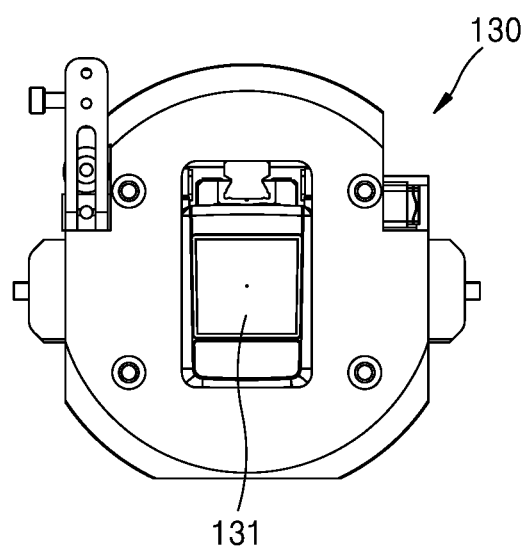
FIG. 5 shows a positioning sensor according to an embodiment of the present disclosure.
Figure 6:
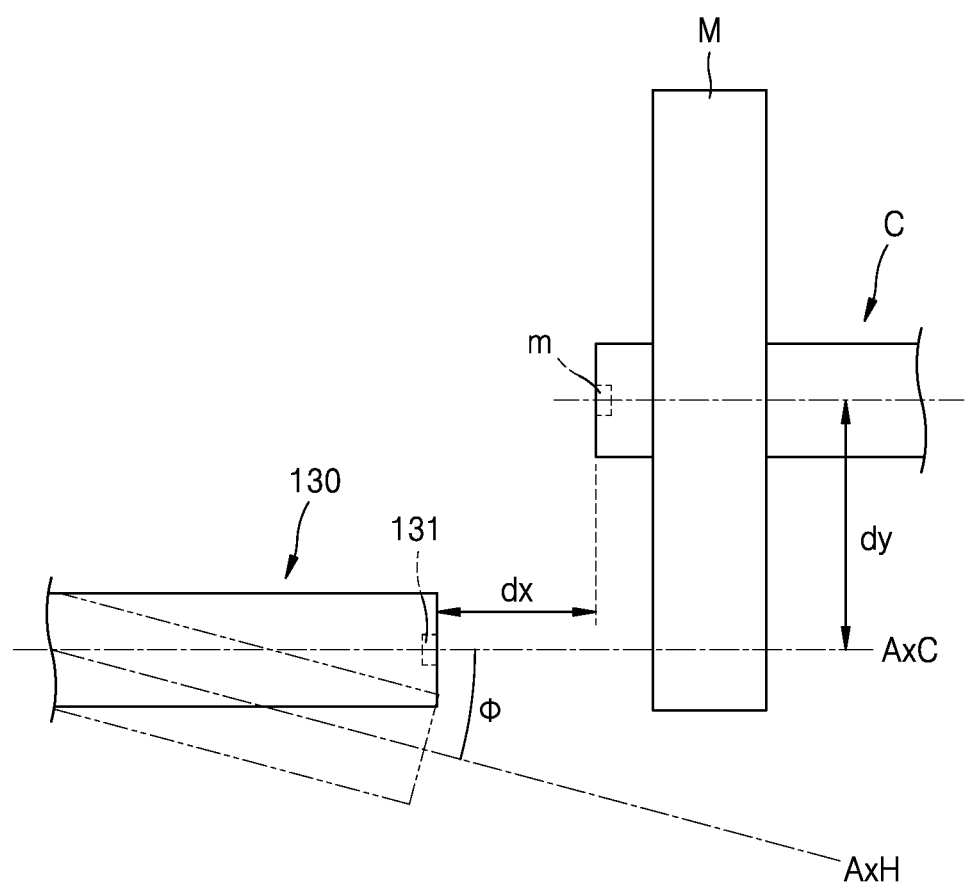
FIG. 6 shows an operation of the positioning sensor according to an embodiment of the present disclosure.
Figure 7:
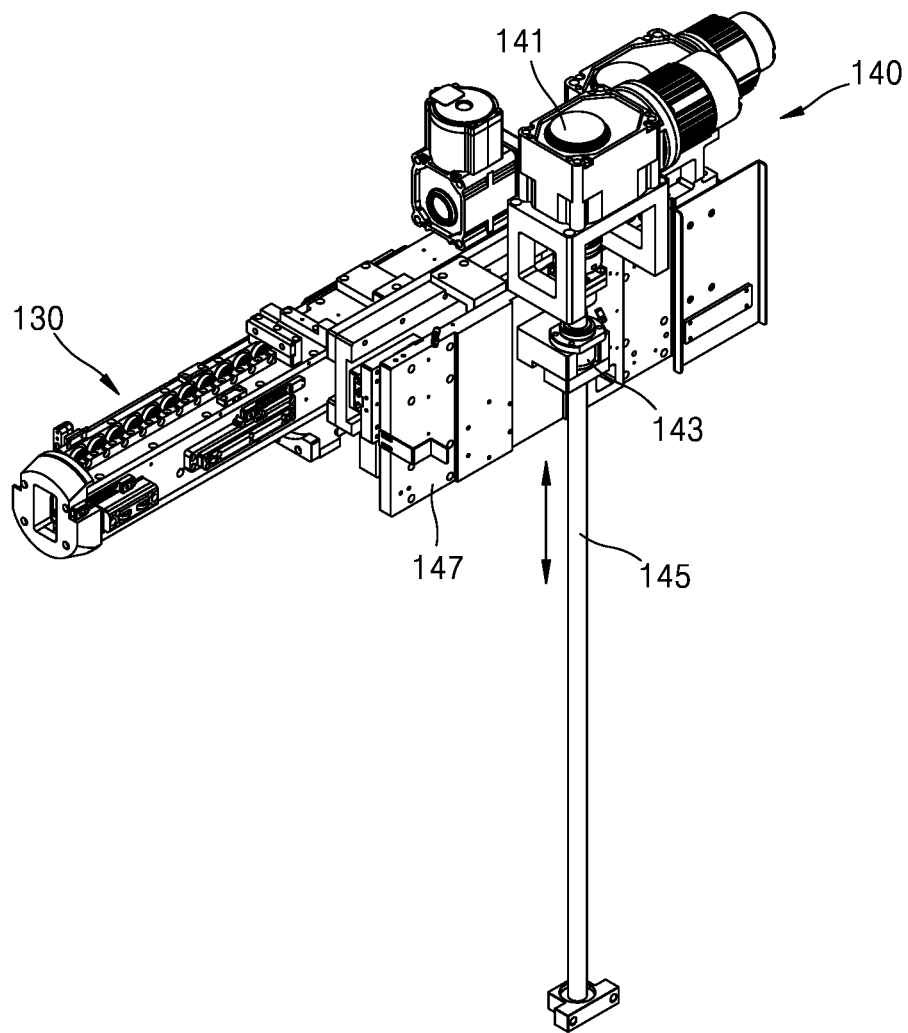
FIG. 7 shows a hand mover according to an embodiment of the present disclosure.
Figure 8:
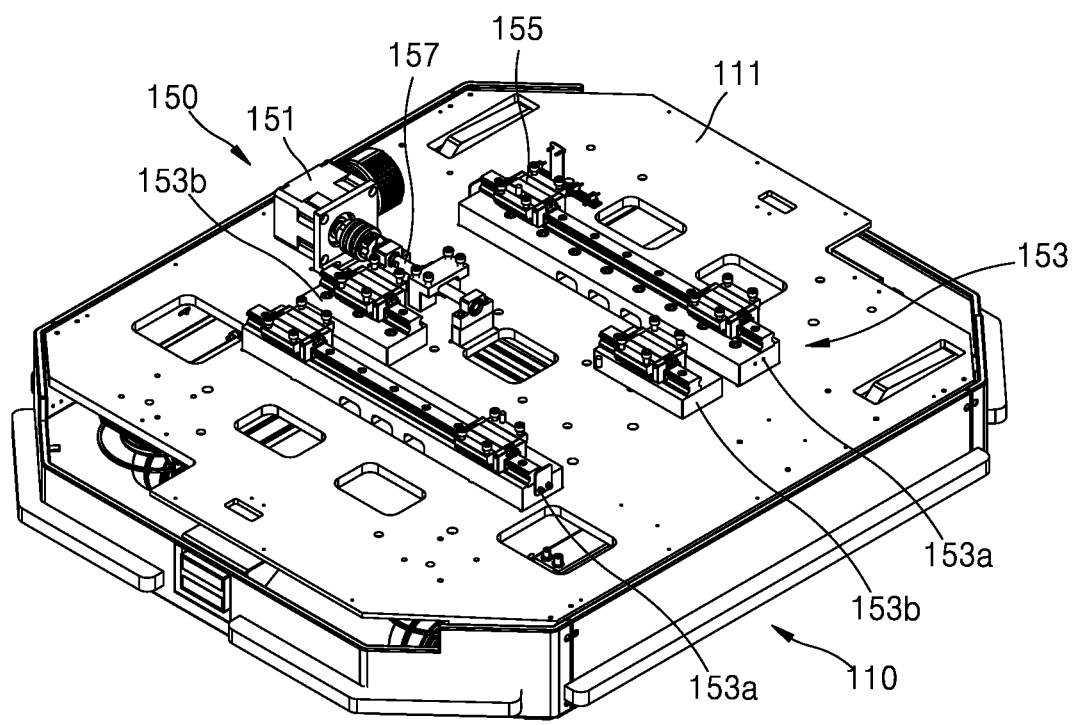
FIGS. 8 and 9 are a rail mover according to an embodiment of the present disclosure.
Figure 9:
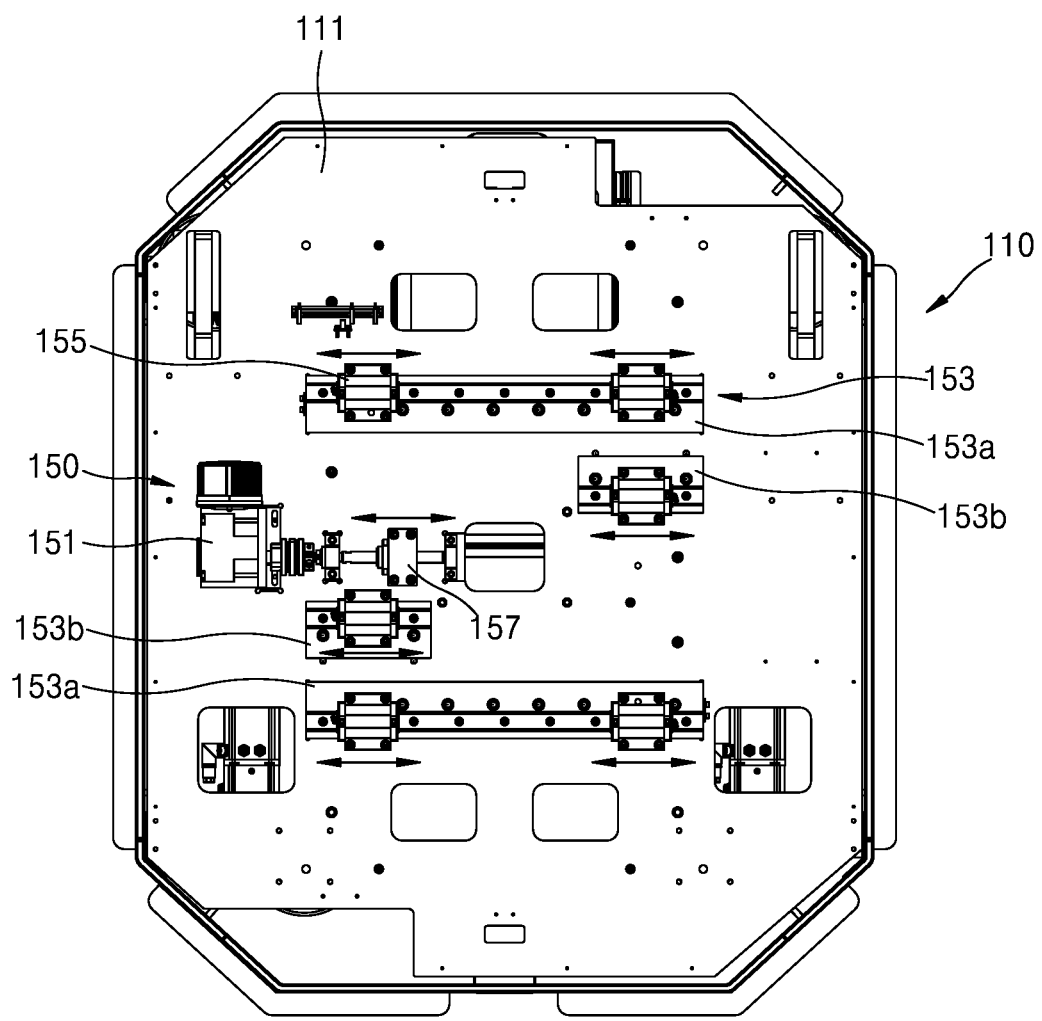
Figure 10:
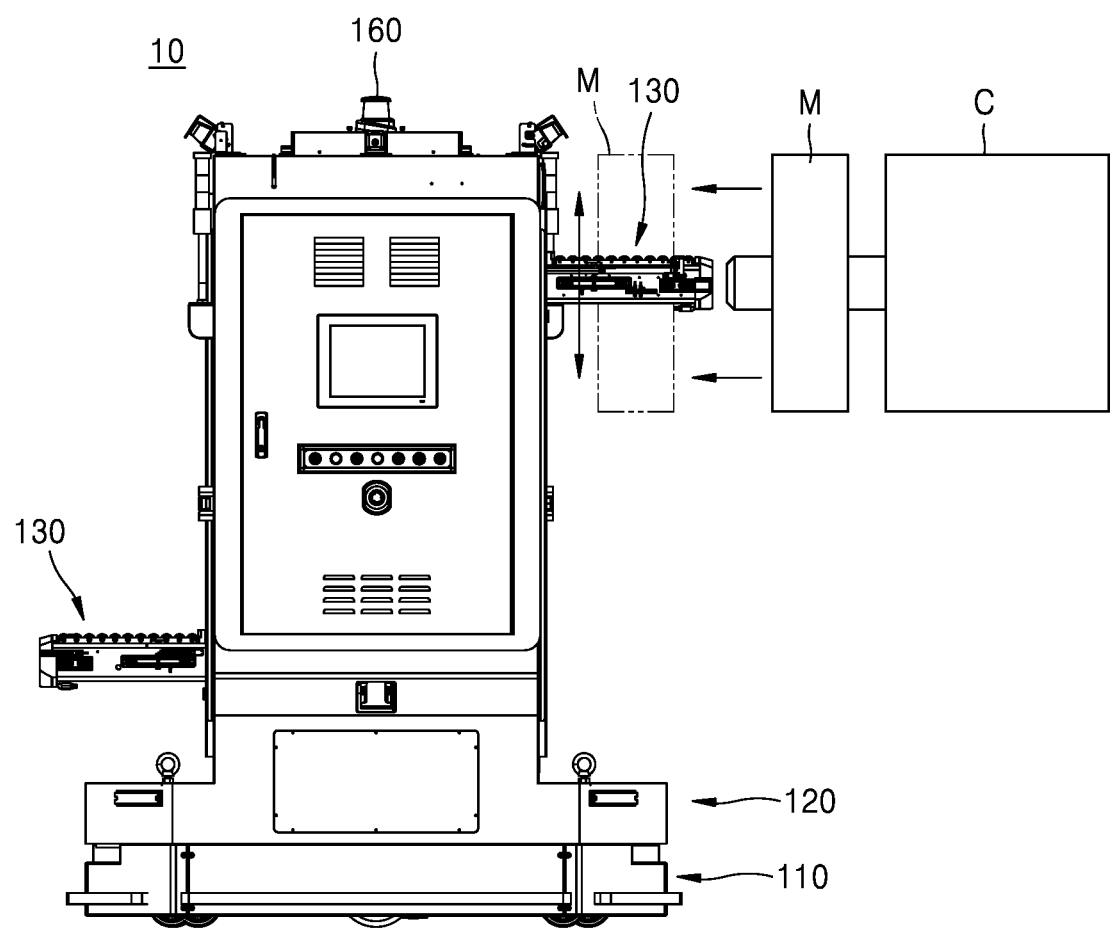
FIGS. 10 and 11 show a state where a material is transported according to an embodiment of the present disclosure.
Figure 11:
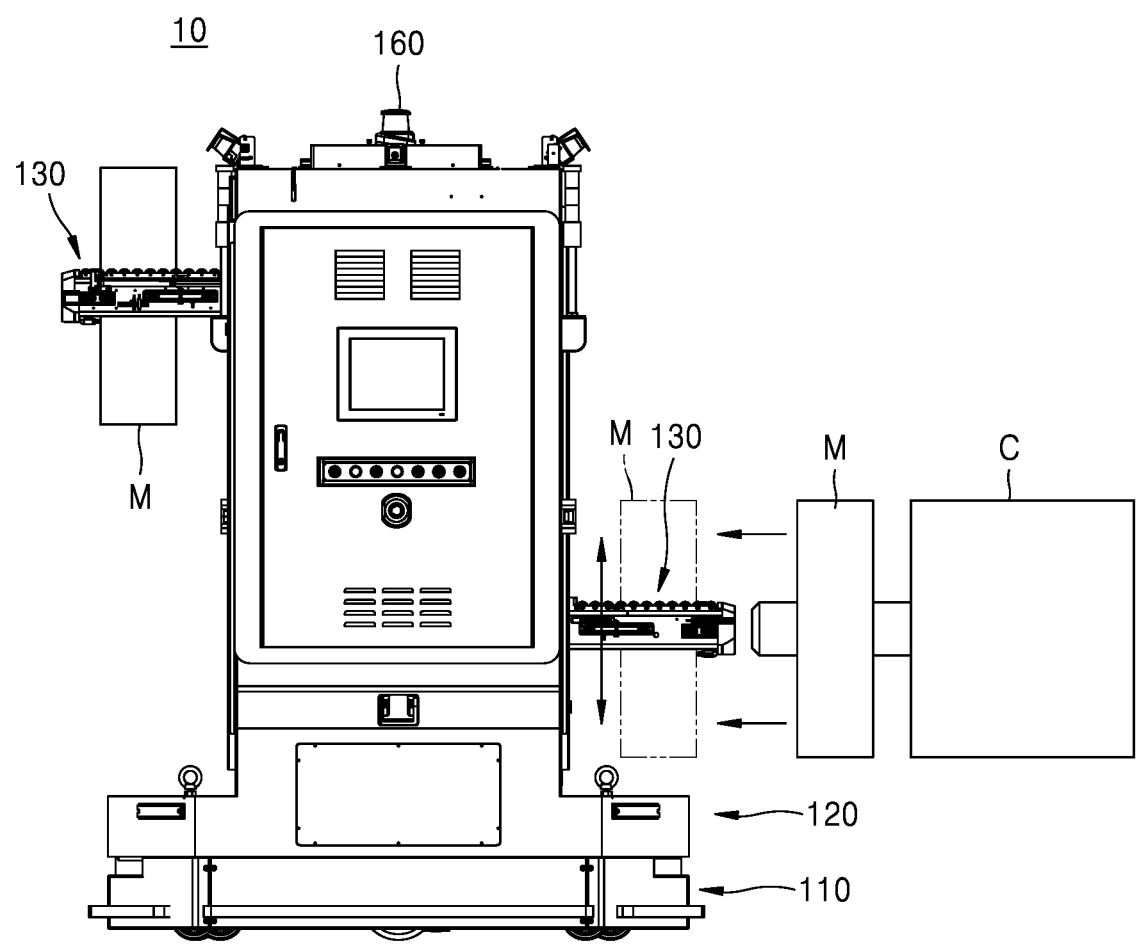

FIG. 1 shows a material transport system 1 including a material transport device 10 according to an embodiment of the present disclosure. FIG. 2 schematically shows the configuration of the material transport device 10 according to an embodiment of the present disclosure. FIG. 3 shows a perspective view of the material transport device 10 according to an embodiment of the present disclosure. FIG. 4 shows a plan view of the material transport device 10 according to an embodiment of the present disclosure. FIG. 5 shows a positioning sensor 131 according to an embodiment of the present disclosure. FIG. 6 shows an operation of the positioning sensor 131 according to an embodiment of the present disclosure. FIG. 7 shows a hand mover 140 according to an embodiment of the present disclosure. FIGS. 8 and 9 are a rail mover 150 according to an embodiment of the present disclosure. FIGS. 10 and 11 show a state where a material M is transported according to an embodiment of the present disclosure.

Referring to FIGS. 1 to 11, the material transport device 10 according to an embodiment of the present disclosure may be used to transport the material M. The type of the material M is not particularly limited, and may be a reel or a roll wound in a cylindrical core shape. For example, the material M may be a steel plate, paper, or an electrode plate for a secondary battery. Also, the material M may have a shape other than a cylindrical shape. Hereinafter, for convenience of description, a case in which the material M has an annular shape is mainly described.

Referring to FIG. 1, the material transport device 10 according to an embodiment of the present disclosure may move the material M to a counterpart device C from a work area. For example, in a state where the material transport device 10 does not initially hold the material M, the material transport device 10 may be stopped at a preset position (a solid line in FIG. 1). Thereafter, the material transport device 10 receives a user's instructions through a set program or a server 30, and moves to the first counter device C along a set path. As shown in FIG. 1, after arriving at the first counter device C, the material transport device 10 determines the position of the counter device C and calibrates the position of a transfer hand 130. When a position calibration is completed, the material transport device 10 delivers this to the server 30 or the counterpart device C, and receives the material M from the counterpart device C.

When the material M is completely loaded, the material transport device 10 moves to the next counter device C again. In an embodiment, the material transport device 10 may move with the transfer hand 130 facing forward.

In a state where the material M is loaded on one transfer hand 130, the material transport device 10 moves to the counterpart device C to load the material M on the other transfer hand 130. Similarly, the material transport device 10 calibrates the position of the transfer hand 130 and receives the material M from the counterpart device C when the position calibration is completed.

When the material M is loaded, the material transport device 10 moves to the other counterpart device C to deliver the loaded material M. Contrary to the loading of the material M, the material transport device 10 may deliver the material M from the transfer hand 130 to the counterpart device C after arriving at the counterpart device C. When unloading is completed, the material transport device 10 may return to its original position.

In an embodiment, the material transport device 10 may be included in the material transport system 1. The material transport system 1 may include the material transport device 10, a position recognition sensor 20, and the server 30. One or more position recognition sensors 20 are disposed in the work area where the material transport device 10 operates. The position recognition sensor 20 sends a signal to the material transport device 10 to determine its position in real time. For example, when the position recognition sensor 20, which is a laser irradiation device, irradiates a laser to the material transport device 10, a navigation 160 of the material transport device 10 receives the laser and detects the position of the material transport device 10.

The server 30 transmits and receives data through a communication module 170 of the material transport device 10. For example, a user may control a moving path and speed of the material transport device 10 through the server 30. In addition, when the material transport device 10 deviates from a preset path, the material transport device 10 may notify this to the server 30, and the user may reset a movement path of the material transport device 10 through the server 30.

Referring to FIGS. 2 to 4, the material transport device 10 according to an embodiment of the present disclosure may include an unmanned transport vehicle 110, a main body 120, a transfer hand 130, a hand mover 140, a rail mover 150, a navigation 160, the communication module 170, a controller 180, a display 190, a first surrounding detection sensor 200, a second surrounding detection sensor 210, and an alarm 220.

The unmanned transport vehicle 110 is a cart for moving the material transport device 10 and may be an automated guided vehicle (AGV). As shown in FIG. 3, the unmanned transport vehicle 110 may be disposed below the material transport device 10 and may move through a mover (not shown), such as wheels disposed inside.

In an embodiment, the unmanned transport vehicle 110 may perform linear motion and rotational motion. For example, the unmanned transport vehicle 110 may rotate in a horizontal direction with respect to a central axis Ax.

The main body 120 is disposed on the upper surface of the unmanned transport vehicle 110 and supports other components of the material transport device 10. For example, the main body 120 has an inner space, and other components of the material transport device 10 may be disposed inside or outside the main body 120.

The transfer hand 130 is disposed on one side of the unmanned transport vehicle 110 and directly transports the material M. For example, a total of two transfer hands 130 may be one each disposed on one side and the other side of the main body 120. In addition, the transfer hands 130 may be disposed on one surface of the main body 120 and on the other surface opposite thereto, so as to face each other with respect to the central axis Ax. In particular, as shown in FIG. 4, the two transfer hands 130 may be arranged side-by-side on the central axis Ax in the longitudinal direction when viewed from a plane.

However, the number and arrangement of the transfer hands 130 are not particularly limited. For example, one or more transfer hands 130 may be disposed, and when a plurality of transfer hands 130 are provided, the plurality of transfer hands 130 may be disposed on adjacent side surfaces among a plurality of side surfaces of the main body 120, respectively. Hereinafter, for convenience of description, a case in which the transfer hands 130 are one each disposed on two side surfaces of the main body 120 facing each other is mainly described.

In an embodiment, at least a part of the transfer hand 130 may be disposed inside the main body 120 and the remaining part thereof may be disposed outside the main body 120. The material M delivered from the counterpart device C is loaded on an outwardly protruding part of the transfer hand 130. In addition, the material M may be unloaded to the counterpart device C through the protruding part. Here, loading means a state where the material M is delivered to the material transport device 10, that is, the transfer hand 130, and unloading means a state where the material M is separated from the material transport device 10, that is, the transfer hand 130.

In an embodiment, the transfer hand 130 may be moved up and down by the hand mover 140 while being disposed on the main body 120 and adjust its height with the counterpart device C. In addition, the transfer hand 130 may adjust its height and angle with the counterpart device C through a tilting unit 139 to be described below.

In an embodiment, the plurality of transfer hands 130 may operate independently of each other. For example, as shown in FIGS. 3 and 4, when the two transfer hands 130 are disposed, even if one transfer hand 130 moves in the vertical direction, the other transfer hand 130 may not move. That is, the hand mover 140 described below may be provided in the same number as the transfer hand 130 and may operate individually.

In another embodiment, the plurality of transfer hands 130 may interoperate with each other. For example, two transfer hands 130 may share one hand mover 140.

In an embodiment, as shown in FIG. 3, only a part of the transfer hand 130 may be exposed to the outside through an opening formed in one or more side surfaces of the main body 120. Also, a shutter type door may be disposed in the opening. Through this, the exposure of the transfer hand 130 may be minimized during operation of the material transport device 10, and the inflow of foreign substances may be blocked by closing the door when the material transport device 10 is not in use.

In an embodiment, the transfer hand 130 may include the positioning sensor 131. As shown in FIG. 5, the positioning sensor 131 may be disposed at the front end of the transfer hand 130. More specifically, the positioning sensor 131 may be disposed inside the front end of the transfer hand 130 when viewed from the front.

The positioning sensor 131 determines the position of the counterpart device C and delivers this to the material transport device 10 or the server 30 to calibrate the position of the transfer hand 130. For example, FIG. 6 shows a state where the material transport device 10 is located in front of the counter device C for loading the material M. Even if the material transport device 10 moves to a designated position along a preset path, a position difference between the transfer hand 130 and the counterpart device C inevitably occurs, and, in order to stably deliver the material M, the position of the transfer hand 130 needs to be calibrated.

In an embodiment, the positioning sensor 131 may determine the position of the transfer hand 130 or the position difference between the transfer hand 130 and the counterpart device C, by recognizing a marker m disposed on one side of the counterpart device C. For example, the positioning sensor 131 may be any one of non-contact sensors, such as a laser sensor, an ultrasonic sensor, a LIDAR sensor, a RADAR sensor, an infrared sensor, etc. or a combination thereof. Alternatively, a sensor constituting the positioning sensor 131 may be any one of contact sensors, such as a differential transformer using an induced electromotive force, a potentiometer, a resolver, etc. or a combination thereof. However, hereinafter, for convenience of description, a case in which the positioning sensor 131 is a vision sensor is mainly described.

In an embodiment, the positioning sensor 131 is disposed at the front end of the transfer hand 130 and photographs the front end of the counterpart device C, more specifically, the marker m of the counterpart device C. The marker m may have a specific shape, pattern, or color. The positioning sensor 131 may calculate an amount of movement required for the position calibration of the transfer hand 130 by comparing an image of the photographed marker m and surroundings thereof with a previously stored reference image. Alternatively, the positioning sensor 131 may deliver the captured image to the material transport device 10 or the server 30, and the controller 180 or the server 30 of the material transport device 10 may calculate the amount of movement required for the position calibration and move the material transport device 10.

As shown in FIG. 6, the positioning sensor 131 may capture an image, compare the image with the reference image, and calculate the amount of movement required for calibrating the position difference between the transfer hand 130 and the counterpart device C, that is, the position of the transfer hand 130.

For example, at the initial position, the transfer hand 130 may have a central axis A×H, and the counterpart device φ may have a central axis A×C. The positioning sensor 131 calculates an angle φ between the central axis A×H and the central axis A×C based on the captured image. Here, the angle φ represents an angle in 3D space.

Based on this, the material transport device 10 moves the transfer hand 130 by the angle φ. For example, the material transport device 10 may rotate the unmanned transport vehicle 110 to calibrate the angle φ, or tilt the transfer hand 130 using a tilting unit (not shown) tilting the transfer hand 130 and adjust the angle φ.

In a state where the angle of the transfer hand 130 is calibrated, the positioning sensor 131 calculates a horizontal distance difference dx between the end of the transfer hand 130 and the end of the counterpart device C, and a vertical distance difference dy between the central axis A×H of the transfer hand 130 and the central axis A×C of the counterpart device C.

The material transport device 10 moves the transfer hand 130 by the horizontal distance difference dx and the horizontal distance difference dy. For example, the material transport device 10 may calibrate the horizontal distance difference dx by moving the main body 120 and the transfer hand 130 in the horizontal direction using the unmanned transport vehicle 110. Alternatively, the material transport device 10 may calibrate the horizontal distance difference dx by moving the main body 120 and the transfer hand 130 in the horizontal direction using the rail mover 150 to be described below. In addition, the material transport device 10 may calibrate the horizontal distance difference dy by lifting the transfer hand 130 using the hand mover 140.

When calibration is completed, the positioning sensor 131 may notify this to the material transport device 10 or the server 30. For example, when the position calibration is completed, the positioning sensor 131 may photograph the marker m again and determine the position difference between the transfer hand 130 and the counterpart device C again based on the captured image. When there is no position difference between the transfer hand 130 and the counterpart device C, the positioning sensor 131 may end the position calibration, and when there is still a position difference between the counterpart device C, the positioning sensor 131 may perform the position calibration again.

Although not shown in the drawings, the transfer hand 130 may further include the tilting unit (not shown). The tilting unit may tilt the transfer hand 130 in a yaw direction, a roll direction, or a pitch direction. An amount of calibration required for tilting may also be determined through the positioning sensor 131.

The hand mover 140 is disposed on one side of the main body 120 and moves the transfer hand 130. For example, as shown in FIG. 7, the hand mover 140 may be disposed inside the main body 120 to be close to the transfer hand 130. The hand mover 140 may lift the transfer hand 130, and may be provided in the same number as the transfer hand 130. Alternatively, one hand mover 140 may lift the plurality of transfer hands 130.

In an embodiment, the hand mover 140 may include a hand moving motor 141, a lifting member 143, a moving guide 145, and a lifting plate 147.

When the hand moving motor 141 disposed on one side of the transfer hand 130 operates, the lifting member 143 connected to the hand movement motor 141 operates. The hand movement motor 141 may operate separately from a motor driving the transfer hand 130. The lifting member 143 may be disposed below the hand moving motor 141 and may convert a rotational motion of the hand moving motor 141 into a lifting motion.

The lifting member 143 may lift in a height direction along the moving guide 145. The moving guide 145 is a member in a rod shape having one side connected to the hand movement motor 141 and the other side connected to one side of the main body 120, and guides the lifting motion of the lifting member 143. The lifting plate 147 is disposed between the lifting member 143 and the transfer hand 130. As the lifting plate 147 is connected to the transfer hand 130, the transfer hand 130 lifts according to the lifting by the lifting member 143. Through this, the hand mover 140 may calibrate the position of the transfer hand 130 in the height direction.

The rail mover 150 is disposed on one side of the unmanned transport vehicle 110 and calibrates the position of the main body 120. For example, as shown in FIG. 8, the rail mover 150 may be disposed on an upper surface 111 of the unmanned transport vehicle 110. The upper surface 111 of the unmanned transport vehicle 110 may be disposed to face the lower surface of the main body 120, and the rail mover 150 may be disposed between the unmanned transport vehicle 110 and the main body 120. For example, the rail mover 150 may move the main body 120 in the width direction or the length direction of the material transport device 10 and calibrate the position of the transfer hand 130.

In an embodiment, the rail mover 150 may include a rail driving motor 151, a sliding rail 153, a slider 155, and a linear moving member 157.

The rail driving motor 151 disposed on one side of the upper surface 111 of the unmanned transport vehicle 110 is connected to the linear moving member 157. When the rail driving motor 151 rotates, the linear moving member 157 moves in one direction (for example, the width direction of the material transport device 10). One side of the linear moving member 157 is connected to the bottom surface of the main body 120, and, as the linear moving member 157 moves, the slider 155 moves, and the main body 120 moves.

One or more sliding rails 153 may be disposed in a direction in which the main body 120 moves. For example, the sliding rail 153 may include one or more first sliding rails 153*a* and one or more second sliding rails 153*b*. In an embodiment, as shown in FIG. 8, two relatively long first sliding rails 153*a* may be disposed in parallel, and two relatively short second sliding rails 153*b* may be disposed between a pair of first sliding rails 153*b*. Also, the two second sliding rails 153*b* may be arranged symmetrically in a diagonal direction.

The slider 155 may move along each sliding rail 153, and have one side connected to the bottom surface of the main body 120. For example, a plurality of (e.g., two) sliders 155 may be disposed on the first sliding rail 153*a*, and one slider 155 may be disposed on the second sliding rail 153*b*. The plurality of sliders 155 disposed on the first sliding rail 153*a* may be spaced apart so as not to interfere with each other during movement.

In an embodiment, each sliding rail 153 may have stoppers at both ends in the longitudinal direction. Accordingly, the slider 155 may move only as much as the length of the sliding rail 153, and through this, the upper limit of the amount of position calibration of the main body 120 or the transfer hand 130 may be set.

Accordingly, as shown in FIG. 9, when the rail driving motor 151 operates, the linear moving member 157 may move in the width direction of the material transport device 10, and the slider 155 may move along the sliding rail 153 so that the main body 120 may move. Through this, the position of the transfer hand 130 may be calibrated.

In the drawings, one rail mover 150 is disposed, and the position of the main body 120 is calibrated in one direction (e.g., the width direction of the material transport device 10), but the present disclosure is not limited thereto. For example, the plurality of rail movers 150 may be disposed in the height direction, and may calibrate the position of the main body 120 in different directions. More specifically, any one of the rail movers 150 may move the material transport device 10 in the width direction of the material transport device 10, and the remaining rail movers 150 may be disposed thereabove or therebelow to move the material transport device 10 in the longitudinal direction of the material transport device 10. Also, when three or more rails are arranged, the remaining rail movers 150 may move the material transport device 10 in a diagonal direction extending between the width direction and the longitudinal direction of the material transport device 10.

The navigation 160 may be disposed on the upper surface of the main body 120 and may identify the position of the material transport device 10 in real time. For example, the navigation 160 may detect signals from a plurality of position recognition sensors 20 disposed in an area in which the material transport device 10 operates, and identify the position of the material transport device 10 (2D or 3D coordinates) based on the signals. The navigation 160 may transmit the position of the material transport device 10 to the server 30, and the user may grasp the current position and movement path of the material transport device 10 based on the position.

The material transport device 10 may transmit/receive data with the server 30, the counterpart device C, or other external devices by wire or wirelessly through the communication module 170. The communication method of the communication module 170 is not particularly limited, and may use, for example, a short-range or long-range wireless communication method or a wired communication method such as Bluetooth, Zigbee, WiFi, IrDA, HomeRF, RFID, NFC, MST, NFMI, Beacon, LoRa, etc.

The controller 180 controls other components of the material transport device 10 through a preset program or an external input. For example, the controller 180 may control the unmanned transport vehicle 110 to move the material transport device 10 according to a preset path and a sequence. In addition, the controller 180 may control the unmanned transport vehicle 110 by receiving a user's instructions input through the server 30. Also, the controller 180 may control operations of the transfer hand 130, the hand mover 140, and the rail mover 150.

According to an embodiment, the controller 180 may use a direct circuit structure, such as a memory, a processor, a logic circuit, a look-up table, etc. that may execute the respective control functions through controls of one or more microprocessors or other control apparatuses. According to an embodiment, the controller 180 may be specifically embodied by a module, a program, or a part of code, which contains one or more executable instructions for performing specified logic functions, and executed by one or more microprocessors or other control apparatuses. Further, the controller 180 may include or may be implemented by a processor such as a central processing (CPU) that performs the respective functions, a microprocessor, or the like, according to an embodiment. According to an embodiment, the communication module 170 may include any one or any combination of a digital modem, a radio frequency (RF) modem, an antenna circuit, a WiFi chip, and related software and/or firmware.

The display 190 is disposed on one side of the main body 120 to render and display the current state of the material transport device 10. For example, the display 190 is disposed on the side surface of the main body 120 and may display the moving speed, moving path, a state where the material M is loaded, load, etc. of the material transport device 10.

The first surrounding detection sensor 200 is disposed on one side of the main body 120 and detects the surroundings of the material transport device 10. For example, the first surrounding detection sensor 200 may be one of a vision sensor, a laser sensor, an infrared sensor, a thermal sensor, and an ultrasonic sensor. As shown in FIG. 3, the first surrounding detection sensor 200 may be disposed on the front of the main body 120, that is, in a direction in which the material transport device 10 moves.

In an embodiment, the first surrounding detection sensor 200 may detect the surroundings of the material transport device 10 in a horizontal direction. One or more first surrounding detection sensors 200 may be provided. When detecting an obstacle within a preset distance, the first surrounding detection sensor 200 notifies the controller 180 or the server 30 of the obstacle, and the alarm 220 to be described below indicates this by sound or light.

The second surrounding detection sensor 210 is disposed on the other side of the main body 120 and detects the surroundings of the material transport device 10. For example, the second surrounding detection sensor 210 may be one of a vision sensor, a laser sensor, an infrared sensor, a thermal sensor, and an ultrasonic sensor. As shown in FIG. 3, the second surrounding detection sensor 210 may be disposed on the side surface of the main body 120, more specifically, on the side surface in which the transfer hand 130 is not disposed.

In an embodiment, the second surrounding detection sensor 210 may detect the surroundings of the material transport device 10 in a vertical direction. One or more second surrounding detection sensors 210 may be provided. When detecting an obstacle within a preset distance, the second surrounding detection sensor 210 notifies the controller 180 or the server 30 of the obstacle, and the alarm unt 220 to be described below indicates this by sound or light.

When the material transport device 10 performs an abnormal operation, the alarm 220 may indicate the abnormal operation thereof by sound or light. As shown in FIG. 3, one or more alarms 220 may be disposed on one side of the main body 120. In an embodiment, when the material transport device 10 deviates from a preset path, the alarm 220 may notify this to workers in the work space by sound or light. Alternatively, when the first surrounding detection sensor 200 and/or the second surrounding detection sensor 210 detects an obstacle around the material transport device 10, the alarm 220 may notify this to workers.

When the material transport device 10 performs a specific operation, for example, when the material transport device 10 rotates or moves backward, a warning light 230 disposed on one side of the material transport device 10 may notify this within the work area through light.

Referring to FIGS. 1 to 11, an operating method of the material transport device 10 according to an embodiment of the present disclosure and a material transport method according thereto are described.

In a state where the material M is not loaded on the material transport device 10, the material transport device 10 may be stopped at a preset position. For example, as shown in FIG. 1, the material transport device 10 may be parked at a specific position within the work area. Thereafter, when receiving an operation command from the server 30, the material transport device 10 starts driving along a preset path. Here, the preset path may be a path considering the size of the work area, the loading order of the material M, the arrangement of the counterpart device C, etc.

First, the material transport device 10 may move to the counterpart device C on which the material M is loaded. The unmanned transport vehicle 110 may move the material transport device 10 to a preset position along the preset path.

In an embodiment, in the operation of moving the unmanned transport vehicle 110 along the preset path, the navigation 160 may receive a signal from the position recognition sensor 20 disposed in the work area, and identify the position of the material transport device 10 in real time. In addition, when the position of the material transport device 10 deviates from the preset path, the navigation 160 may display this through the alarm 220 and notify this to the server 30 so that the user may set the path of the material transport device 10 again.

When the material transport device 10 arrives in front of the counter device C, the transfer hand 130 is arranged to direct the front end of the counter device C to load the material M. In this state, the positioning sensor 131 disposed at the front end of the transfer hand 130 detects the marker m of the counterpart device C, and determines the position difference between the transfer hand 130 and the counterpart device C.

For example, as shown in FIG. 6, the positioning sensor 131 may photograph the marker m and surroundings thereof, and may measure a distance difference between the transfer hand 130 and the counterpart device C and an angle at which the central axis deviates based on the captured image. More specifically, the positioning sensor 131 may determine coordinates of the center of the marker m and coordinates of a reference point of the image from the captured image, and may determine the position and angle differences between the marker m and the transfer hand 130. The material transport device 10 calibrates the position of the transfer hand 130 based on this.

In an embodiment, in the operation of calibrating the position of the transfer hand 130, the material transport device 10 may calibrate the position of the transfer hand 130 in the height direction by lifting the transfer hand 130 using the hand mover 140. Alternatively, the material transport device 10 may calibrate the position of the transfer hand 130 by moving or rotating the main body 120 using the unmanned transport vehicle 110. Alternatively, the material transport device 10 may calibrate the position of the transfer hand 130 by moving only the main body 120 in the width direction of the unmanned transport vehicle 110 using the rail mover 150. Alternatively, the material transport device 10 may calibrate the position of the transfer hand 130 by tilting the transfer hand 130 in the roll, pitch, or yaw direction using the tilting unit.

In an embodiment, in the operation of calibrating the position of the transfer hand 130, after calibrating the position, the material transport device 10 may determine the position difference with the counterpart device C again using the positioning sensor 131. When the position difference is within an error, the material transport device 10 completes a position calibration operation and performs an operation of loading the material M. When the position difference exceeds the error, the material transport device 10 performs the position calibration operation again.

When the position calibration is completed, the transfer hand 130 or the material transport device 10 notifies the counterpart device C or the server 30 that it is ready to load the material M. Then, the counterpart device C delivers the material M to the transfer hand 130 using a pusher (not shown).

When the material M is loaded on the transfer hand 130, the material transport device 10 escapes from the counterpart device C and moves to a next operation. For example, the material transport device 10 may move to another relative device C in order to load the material M on the remaining transfer hand 130.

When the operation of loading the material M is completed, the material transport device 10 moves to deliver the material M to another counterpart device C, that is, to unload the material M.

The operation of unloading the material M may be performed in the same manner as the operation of loading the material M. That is, when the material transport device 10 arrives at a preset position, the positioning sensor 131 of the transfer hand 130 recognizes the marker m disposed at the front end of the counterpart device C, and determines the position difference between the transfer hand 130 and the counterpart device C. Based on this, the material transport device 10 calibrates the position of the transfer hand 130, and when the calibration is completed, the pusher (not shown) of the transfer hand 130 delivers the material M to the counterpart device C. When the material M is completely separated from the transfer hand 130, the material transport device 10 may determine that the unloading operation is completed and return to its original position.

The material transport device 10 and the material transport method according to an embodiment of the present disclosure may accurately deliver the material M between the material transport device 10 and the counterpart device C.

As described above, the present disclosure has been described with reference to the embodiment illustrated in the drawings, but this is merely an example. Those of ordinary skill in the art will fully understand that various modifications and other equivalent embodiments may be made from the embodiments. Therefore, the scope of the protection of the technology of the present disclosure should be determined by the appended claims.

Specific technical descriptions in the embodiments are embodiments and do not limit the technical scope of the embodiments. In order to concisely and clearly describe the present disclosure, descriptions of general techniques and configurations of the related art may be omitted. Also, connections or connection members of lines between elements illustrated in the drawings are examples of functional connections and/or physical or circuit connections, and may be represented by various alternative or additional functional connections, physical connections, or circuit connections in an actual device. In addition, unless specifically stated as "essential" or "importantly", an element may not be a necessary element for the application of the present disclosure.

The term "above" or similar referring expressions used in the description and claims of the present disclosure may refer to both the singular and plural expressions unless otherwise specified. Also, when a range is described in the embodiments, it means that embodiments to which individual values belonging to the range are applied are also included (unless otherwise stated), it is the same as each individual value constituting the range is described in the detailed description of the present disclosure. Moreover, operations constituting the method according to the embodiments may be performed in an appropriate order, if the order is explicitly stated or unless otherwise stated. The embodiments are not necessarily limited according to the order of the description of the steps or operations. All examples or illustrative terms (e.g., etc.) in the embodiments are merely used to describe the embodiments in detail, and the scope of the embodiments is limited by the examples or illustrative terms unless limited by the claims. In addition, those of ordinary skill in the art will appreciate that various modifications, combinations, and changes may be made in accordance with design conditions and factors within the scope of the appended claims or equivalents thereof.

INDUSTRIAL APPLICABILITY

The present disclosure may be applicable to an industry relating to a material transport device and a material transport method using the material transport device.

The invention claimed is:

1. A material transport device comprising a transfer hand for receiving a material from a counterpart device or delivering the material to the counterpart device, the material transport device comprising:
  an unmanned transport vehicle configured to move along a preset path;
  a main body disposed on the unmanned transport vehicle; and
  wherein the transfer hand is configured to load or unload the material, and comprises a positioning sensor configured to detect a marker disposed on the counterpart device and determine a position difference with the counterpart device,
  wherein the material transport device is configured to calibrate a position of the transfer hand based on the position difference determined by the positioning sensor, and
  wherein the main body comprises an inner space, and the transfer hand is disposed inside the inner space of the main body and at least partially protrudes outward from the inner space of the main body.

2. The material transport device of claim 1, further comprising a hand mover disposed on one side of the main body and configured to move the transfer hand in a vertical direction according to a position of the marker detected by the positioning sensor.

3. The material transport device of claim 2, wherein a pair of transfer hands are provided so as to face each other, and a pair of hand movers are provided to correspond to the pair of transfer hands, respectively, and are driven independently of each other.

4. The material transport device of claim 3, wherein the pair of transfer hands are disposed on a central axis of the material transport device, and
  wherein the pair of hand movers are arranged to face each other with respect to the pair of transfer hands, and comprises hand moving motors and lifting members connected to the pair of transfer hands and configured to move up and down according to driving of the hand moving motor.

5. The material transport device of claim 1, further comprising a rail mover disposed between the unmanned transport vehicle and the main body, and configured to move the main body in a width direction of the unmanned transport vehicle by moving a slider moving along a sliding rail disposed on an upper surface of the unmanned transport vehicle.

6. The material transport device of claim 1, wherein the unmanned transport vehicle is configured to rotate according to a position of the marker detected by the positioning sensor and adjusts an angle at which the transfer hand is directed.

7. The material transport device of claim 1, wherein the positioning sensor is a vision sensor disposed at a front end of the transfer hand and configured to photograph a marker of the counterpart device and calculate a position difference between the transfer hand and the counterpart device based on a captured image.

8. A method of operating the material transport device according to claim 1 comprising receiving a material from a counterpart device or delivering the material to the counterpart device, the method further comprising:
- moving along a preset path, by an unmanned transport vehicle;
- when the unmanned transport vehicle arrives at a preset position, detecting a marker of the counterpart device through a positioning sensor and detecting a position difference between the transfer hand and the counterpart device, by a transfer hand on or from which the material is loaded or unloaded; and
- moving the transfer hand according to a position of the marker detected by the positioning sensor.

9. The method of claim 8, wherein the moving of the transfer hand comprises moving the transfer hand in a vertical direction using a hand mover.

10. The method of claim 9, wherein hand movers are provided in a same number as a pair of transfer hands so as to face each other, and respectively drive the pair of transfer hands independently of each other.

11. The method of claim 9, wherein the moving of the transfer hand comprises driving a hand moving motor and moving a lifting member connected to the transfer hand up and down.

12. The method of claim 8, further comprising moving a slider along a sliding rail through a rail mover and adjusting a position of the transfer hand in left and right directions.

13. The method of claim 8, wherein the moving of the transfer hand further comprises rotating according to a position of the marker detected by the positioning sensor and adjusting an angle at which the transfer hand is directed, by the unmanned transport vehicle.

14. The method of claim 8, wherein the detecting of the position difference comprises photographing a marker of the counterpart device, and calculating a position difference between the transfer hand and the counterpart device based on a captured image, by the positioning sensor which is a vision sensor disposed at a front end of the transfer hand.

* * * * *